United States Patent [19]

Hazenbroek

[11] Patent Number: 4,918,787

[45] Date of Patent: Apr. 24, 1990

[54] POULTRY LUNG EXTRACTOR AND NECK BREAKER

[76] Inventor: Jacobus E. Hazenbroek, Burg. de Zeeuwstraat 52, Numansdorp, Netherlands

[21] Appl. No.: 299,406

[22] Filed: Jan. 23, 1989

[51] Int. Cl.$^5$ ............................................. A22C 21/00
[52] U.S. Cl. ..................................................... 17/11
[58] Field of Search ............................................ 17/11

[56] References Cited

U.S. PATENT DOCUMENTS

| | | | |
|---|---|---|---|
| 3,750,231 | 8/1973 | Schreuder | 17/11 |
| 3,802,028 | 4/1974 | Scheier et al. | 17/11 |
| 4,114,239 | 9/1978 | McClelland | 17/11 |
| 4,704,768 | 11/1987 | Hutting et al. | 17/11 |

Primary Examiner—Willis Little
Attorney, Agent, or Firm—Thomas & Kennedy

[57] ABSTRACT

Previously eviscerated birds are moved on an overhead conveyor in series to the lung extractor and neck breaker, with each bird moving into a poultry processing module (31). The lung extractor tube (48) moves downwardly to engage the lungs and the visceral cavity of the bird. Suction applied to the extractor tube through the suction tube (41) and air transfer block (65) causes the lungs to be extracted from the bird. When no bird is present in one of the stations of the overhead conveyor, the extractor tube is prevented from moving downwardly by the hooks (59), thereby avoiding the pulling of a vacuum through the system. When a bird is present on the shackle, the bird engages and pushed the hooks out of the way so that the extractor tube can properly function. A neck breaker (35) is also part of each poultry processing module, and the cleaver (85) is moved by cam roller (89) and cam track (90) up into engagement with the neck of the bird to break the spinal column.

18 Claims, 3 Drawing Sheets

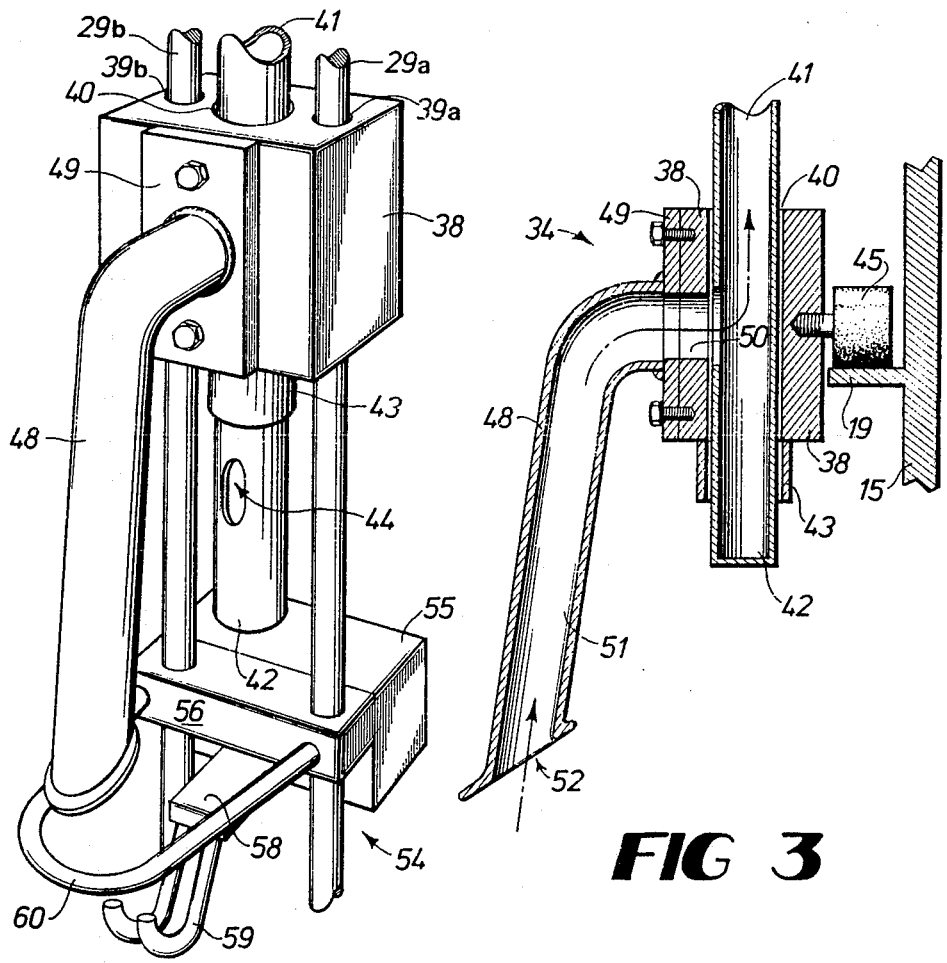
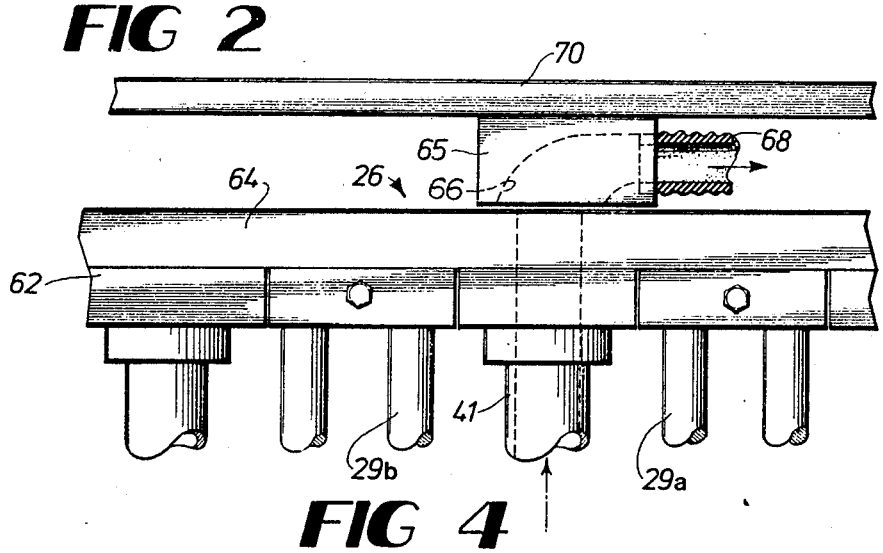

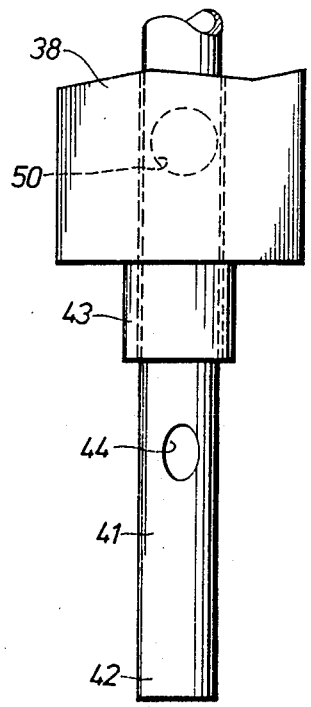 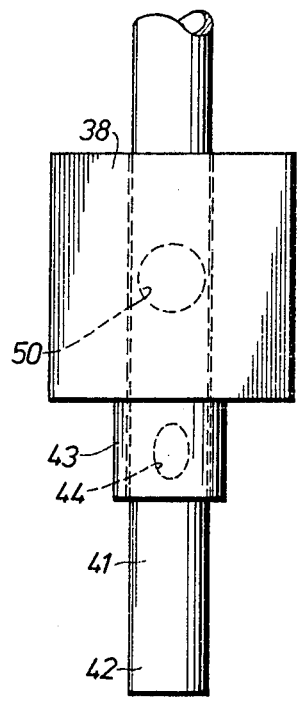 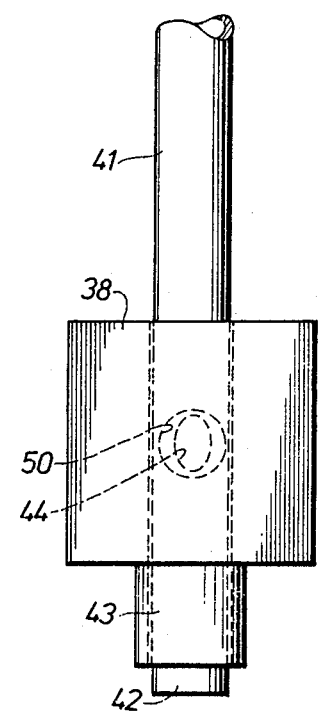
FIG 5        FIG 6        FIG 7
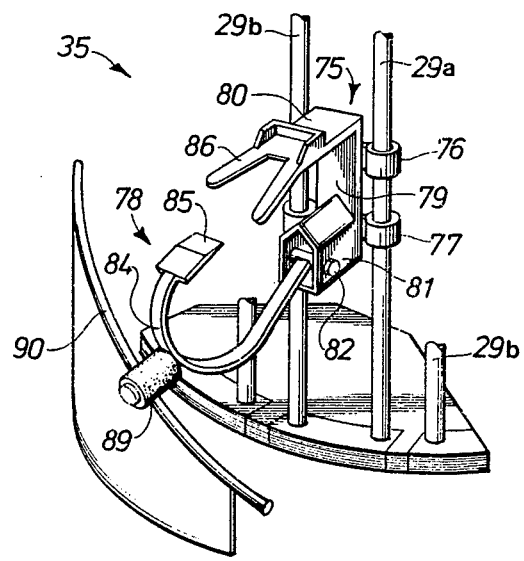
FIG 8

POULTRY LUNG EXTRACTOR AND NECK BREAKER

FIELD OF THE INVENTION

This invention generally relates to the processing of poultry, such as chickens, turkey and other species of poultry, in which the birds are moved in series, suspended invertedly by their legs from an overhead conveyor system, through a series of poultry processing stations, such as a vent removal station, a bird opening station, an eviscerating station, a lung removal station, a neck breaking station and a crop removal station. More particularly, this invention relates to a system for use in a poultry processing line for removing the lungs of birds and for breaking the spinal column in the necks of the birds and removing the necks from the carcass.

BACKGROUND OF THE INVENTION

In the automated processing of poultry for consumption by the public, it has been the common practice in recent years to perform as many steps as possible by automated machinery. Typically, the birds are hung by their legs in an inverted attitude from an overhead conveyor system and carried through a series of poultry processing stations. A typical poultry processing station might include a carousel type machine whereby the chain of the overhead conveyor system extends about a sprocket and the movement of the chain rotates the sprocket. In turn, the rotating sprocket drives the carousel type machine which receives each bird on the processing line and performs its function on each bird before the bird moves away from the machine. Examples of the type machines that function on the carousel principle include the vent removal, the bird opener, the eviscerating machine, and cropping machine. A carousel machine of this type is illustrated in U.S. Pat. No. 3,958,303.

Lung extractors have also been constructed in the carousel style, whereby a series of extractor tubes are mounted on the carousel style machine and as the birds move in an arc about the lung extractor, an extractor tube moves downwardly into the previously eviscerated cavity of the bird and a vacuum is drawn through the extractor tube so as to extract the lungs and possibly other remaining viscera from the visceral cavity of the bird.

One of the problems with poultry lung extractor machines is that when a bird is not moved into each station of the rotary machine, the system attempts to draw the vacuum at the empty station. This causes a substantial amount of energy to be unnecessarily expended at the empty stations, causes an increase in noise level at the station and in the plant overall, and tends to reduce the amount of vacuum that can be drawn at the other stations.

When the necks of birds are to be broken, one prior art process causes the necks of birds suspended from a conveyor system to move into a locator which lifts the bird slightly about the neck and locates the neck adjacent the hard anvil-like surface, and a hammer element moves into engagement with the neck toward the anvil element, causing a break in the spinal column at the neck of the bird. A system of this type is illustrated in U.S. Pat. No. 4,097,960.

SUMMARY OF THE INVENTION

Briefly described, the present invention comprises a poultry lung extractor and neck breaker system, whereby the lungs are removed and the necks are broken as the birds travel in series on an overhead conveyor system through a poultry processing plant. A single machine, preferably a carousel style machine, is provided which efficiently extracts the lungs of the previously eviscerated birds by moving an extractor tube downwardly into the visceral cavity of the bird until the lower end portion of the extractor tube engages the lungs, and then applying a suction to the extractor tube which tends to "vacuum" or extract the lungs from the cavity of the birds. In those instances where a bird is absent from a shackle of the overhead conveyor system such that a bird does not move into a bird processing station of the machine, the machine will not place the extractor tube in communication with the vacuum source during this cycle of operation, which avoids the waste of energy, loud noise and depletion of vacuum source that might otherwise be experienced if suction were drawn at the empty station.

Further, a neck breaker is carried adjacent each lung extractor and functions to break the spinal column and stretch the neck at the break. The neck breaking operation can be performed in unison with or at a slightly offset position with respect to the lung extraction step, and the two functions, although performed on a single machine, do not interfere with each other.

Thus, it is an object of this invention to provide an improved poultry processing machine which efficiently extracts lungs from previously eviscerated birds and breaks the spinal column and stretches the necks of the birds.

Another object of this invention is to provide poultry lung extractor machine which inserts an extractor tube into the visceral cavity of a bird and the extractor tube communicates with a source of low air pressure so as to pull or "vacuum" the lungs from the cavity of the bird, and further functions to avoid drawing the vacuum during those cycles when a bird is not present at the machine.

Another object of this invention is to provide an efficient and effective automated machine for extracting lungs and for breaking the spinal column and stretching the neck of poultry carcasses in a continuing process by receiving the birds in series as they are conveyed invertedly on an overhead conveyor system.

Other objects, features and advantages of this invention will become apparent upon reading the following specification, when taken in conjunction with the accompanying drawings.

BRIEF DESCRIPTION OF THE DRAWINGS

FIG. 2 is a front perspective illustration of a lung extractor assembly.

FIG. 3 is a side cross-sectional illustration of the upper portion of a lung extractor assembly.

FIG. 4 is a cross-sectional view of the upper end of the suction tube, showing the manner in which the suction tube communicates with a source of reduced air pressure.

FIGS. 5, 6 and 7 are sequential schematic side views of the suction tube and the carrier block of the extractor tube, showing in FIG. 5 the carrier block positioned above the opening of the suction tube, showing in FIG. 6 the carrier block projecting over the opening of the suction tube and therefore blocking entry to the suction tube, and showing in FIG. 7 the communication between the opening of the suction tube and the opening of the extractor block.

FIG. 8 is a perspective illustration of the neck breaker assembly of a module of the poultry lung extractor and neck breaker.

DETAILED DESCRIPTION

Figure 1:
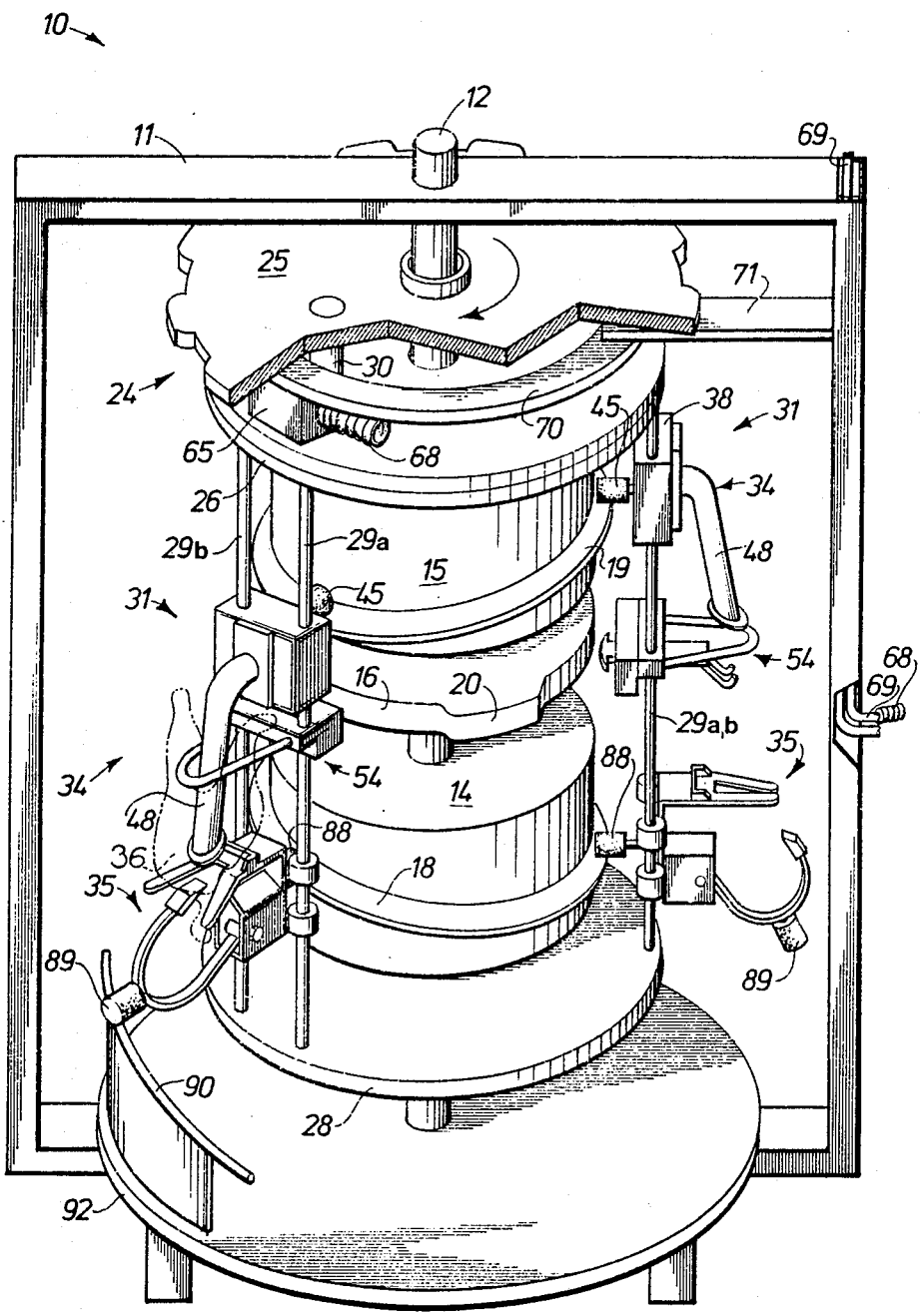
FIG. 1 is a side perspective illustration of the poultry lung extractor and neck breaker, with parts removed for clarity, and with only two of the bird processing modules being shown on the machine.

Referring now in more detail to the drawings, in which like numerals indicate like parts throughout the several views, FIG. 1 illustrates the poultry lung extractor and neck breaker 10 which includes a framework 11 for mounting on the floor of a poultry processing plant. A vertical axle 12 is supported by the cross members of framework 11. Lower cam drum 14, upper cam drum 15 and intermediate cam disc 16 are all rigidly mounted to axle 12. Lower cam drum 14 has a spiral cam track 18 affixed to its cylindrical surface, and upper cam drum 15 similarly has a spiral cam track 19 affixed to its cylindrical surface. Intermediate cam disc 16 includes a cam lobe 20 that protrudes radially outwardly.

A carrier assembly 24 is mounted to axle 12 and includes upper drive sprocket 25, upper disc assembly 26, lower disc assembly 28 and a plurality of pairs of vertical carrier rods 29a and 29b (FIG. 2) which are mounted at their lower and upper ends to the lower and upper disc assemblies 28 and 26. A connector bar 30 is connected between upper drive sprocket 25 and upper disc assembly 26 and normally connects these elements together so that they rotate in unison.

The poultry conveyor system (not shown) extends in conventional manner about the upper drive sprocket 25, so that the chain of the poultry conveyor engages the teeth of the drive sprocket and causes the drive sprocket to rotate about axle 12. The connector 30 transmits this rotary action to the upper disc assembly 26, and the rotary action is further transmitted through the pairs of vertical carrier rods 29a and 29b to the lower disc assembly 28.

The pairs of vertical carrier rods 29a and 29b which are distributed in equally spaced relationship about the machine form part of a plurality of poultry processing modules 31 (only two shown in FIG. 1), with the poultry processing modules 31 being equally circumferentially spaced about the machine. The modules 31 are spaced in accordance with the spacing of the shackles of the conveyor system (not shown) so that a bird carcass 36 will be received at each poultry processing module as the system revolves in response to the movement of the overhead conveyor system. Each of the poultry processing modules 31 include a lung extractor assembly 34 and a neck breaker assembly 35, and both assemblies 34 and 35 are slidably mounted on a pair of the vertically oriented carrier 29a and 29b.

As illustrated in FIGS. 1-3, lung extractor assembly 34 includes a slide block 38 which defines three vertical openings 39a, 39b and 40. Openings 39a and 39b are slidably mounted about vertical carrier rods 29a and 29b, permitting the slide block to move vertically along the carrier rods. A suction tube 41 is positioned parallel to and between carrier rods 29a and 29b, and extends through the central opening 40 of the slide block. The lower end portion 42 of suction tube 41 is closed, and an opening 44 extends through the side of suction tube 41 at a position spaced upwardly from the lower end of the suction tube. Extension sleeve 43 extends downwardly from slide block 38 and extends about the vertical opening 40 of the slide block 38. Extension sleeve 43 covers the opening 44 of the suction tube 41, as will be described in more detail hereinafter. A roller 45 is rotatably mounted to the rear surface of slide block 38 and normally rests on the cam track 19 so as to function as a cam follower. With this arrangement, when the carrier assembly 24 is in motion, the poultry processing modules 31, 32 will revolve in a circular path and the lung extractor assembly 34 will reciprocate vertically as the cam follower 45 of each lung extractor assembly 34 follows the cam track 19 of the upper cam drum 50.

As illustrated in FIGS. 1-3, each lung extractor assembly 34 includes an extractor tube 48 which extends outwardly and downwardly from its slide block 38. The upper end portion of the extractor tube is rigidly mounted to a mounting plate 49, and the mounting plate 49 is bolted to the slide block 38. A bore 50 is formed in the slide block 38 and the mounting plate 49 (FIG. 3), and the upper end portion of the extractor tube 48 registers with the bore 50. The lower end portion 51 of the extractor tube 48 includes a slanted inlet nozzle 52 which is sized and shaped to engage the lungs of a chicken or other species of poultry when the lower end portion 51 of the extractor tube 48 is inserted into the visceral cavity of a bird carcass 36.

As illustrated in FIG. 2, extractor retainer assembly 54 is rigidly mounted to the vertical carrier rods 29a and 29b. Each extractor retainer assembly includes a slide carrier block 55, mounting block 56, slide arm 58, retaining hooks 59 and a guide loop 60. Slide arm 58 is reciprocally received in slide carrier block 55 and is movable from a first position where its retaining hooks 59 are projected beneath the open lower end portion of the extractor tube 48 and to a retracted position where the retaining hooks are moved inwardly out of the way of the extractor tube 48. Guide loop 60 extends out beyond the path of movement of the extractor tube 48, and functions to guide the inverted legs of the bird into a straddled relationship about the guide loop and extractor tube 48.

As illustrated in FIG. 4, the upper end portion of the suction tube 41 is mounted to upper disc assembly 26. Upper disc assembly 26 comprises metal disc assembly 62, to which the plurality of vertical carrier rods 29a and 29b are connected, and nylon disc assembly 64. The disc assemblies 62 and 64 are rigidly connected together and rotate in unison with the machine. One or more vacuum distribution blocks 65 are mounted in a stationary position over upper disc assembly 26 and define a vacuum passage 66. The lower portion of the vacuum passage communicates through the lower portion of the vacuum distribution block with the upper surface of nylon disc assembly 64, while the upper portion of the vacuum passage 66 opens laterally out of the vacuum distribution block 65. A flexible suction conduit 68 has one of its ends connected to lateral opening of vacuum passage 66. The other end portion of the flexible conduit 68 communicates (FIG. 1) with a rigid conduit 69 at the framework of the machine, and the rigid conduit 69 is connected to a vacuum plenum chamber and to the suction inlet of an air compressor.

The vacuum distribution blocks 65 are maintained in a stationary position and in sliding contact with the upper disc assembly 26 by means of a support ring 70 that surrounds axle 12. One or more stabilizing support arms 71 extend from the support ring 70 outwardly to the framework 11 to hold the support ring in place.

As shown in FIGS. 5–7, when the slide block 38 of the lung extractor assembly 34 is moved to its uppermost position, the slide block and its extension sleeve 43 move above the position of the vacuum opening 44 of the suction tube 41. When in this position, the suction tube 41 is not in communication with vacuum distribution block 65, so that there is no movement of air or material through the suction tube 41. When the slide block 38 begins its downward movement, its extension sleeve 43 first covers the opening 44 in the suction tube 41, so that there can be no movement of air through the opening 44. When the slide block moves down further on the suction tube 41, the bore 50 of the slide block registers with the opening 44 of the suction tube 41, and the suction tube will have moved into communication with the vacuum distribution block 65. This causes movement of air upwardly through the extractor tube 48 (FIGS. 2 and 3), then upwardly through vacuum tube 41, through upper disc assembly 26, through vacuum distribution block 65, and through the conduits 68 and 69 to the vacuum plenum chamber (not shown) of the system. When the cam track 19 lifts the slide block 38, the inlet opening 44 is closed again until the extension sleeve 43 moves high enough (FIG. 5) to uncover this opening. However, by the time the slide block 38 reaches the position of FIG. 5, the suction tube 41 will be out of communication with vacuum distribution block 65.

As the slide block 38 moves downwardly, extractor tube 48 moves into the previously eviscerated cavity of a bird positioned at and moving with the poultry processing module, so that the lower inlet nozzle 52 of the extractor tube 48 engages and extracts the lungs of the bird when the extractor tube 48 communicates with the suction applied through suction tube 41.

When the bird is properly carried by the overhead conveyor system to a poultry processing module 31 of the system, the bird is moved into a straddled relationship with respect to the guide loop 60 (FIG. 2), and the tail portion of the bird passes beneath the loop 60 and pushes against the retaining hooks 59 of the slide arm 58, causing the slide arm 58 to be retracted into slide carrier block 55. This effectively moves the slide arm and its retaining hook out of the downward path of extractor tube 48. When the lungs of the bird have been extracted as previously described, and the bird is moved by the conveyor system away from the machine, the other end of the slide arm 58 will engage the cam lobe 20 of the intermediate cam disc 16 (FIG. 1), causing the slide arm 58 and retaining hooks 59 to move outwardly again beneath the extractor tube 48. Thus, the retaining hooks 59 are in a position to engage and catch the extractor tube 48 as it begins to move downwardly under the force of gravity, as the cam track 19 (FIG. 1) permits the downward movement.

If a bird is absent from one of the shackles of the overhead conveyor system and no bird engages the retaining hooks 59 and slide arm 58, the retaining hooks and slide arm will remain beneath the extractor tube 48, and when the extractor tube 48 begins its downward movement, the retaining hooks 59 will engage and retain the extractor tube in an intermediate position (FIG. 6) in which the opening 44 of the suction tube 41 is closed by the extension sleeve 43. With the opening 44 closed in this manner, there will be no flow of air through the suction tube 41 when the suction tube registers with the vacuum distribution block 65 (FIG. 4). This avoids the unnecessary drawing of air through the suction tube and through the extractor tube when a bird is not presented to the extractor tube.

As illustrated in FIGS. 1 and 8, a neck breaker assembly 35 is mounted on the lower end portions of the pairs of vertical carrier rods 29a and 29b. Each neck breaker assembly 35 includes an anvil or yoke assembly 75 that is mounted to the vertical carrier rods 29a and 29b by slide sockets 76 and 77, and a hammer or cleaver assembly 78. The yoke assembly includes an upright support 79 and a laterally outwardly extending V-shaped anvil head or yoke 80. Pivot pin housing 81 is mounted to the upright support 79, and a pivot pin 82 movably connects the cleaver assembly 78 to the pivot pin housing 81.

The cleaver assembly 78 includes a generally U-shaped arm 84 that has one end portion pivotably mounted to the pivot pin housing 81 by pivot pin 82, and a hammer head or cleaver 85 is rigidly mounted to its other end. The spacing and dimensions of the assembly is such that the cleaver 85 oscillates toward and away from the yoke 80. The V-shaped end portion 86 of the yoke 80 is sized and shaped to receive the neck of a bird therein, and the cleaver 85 moves toward the crotch of the V-shaped yoke so as to engage the neck and urge the neck toward the crotch of the yoke, breaking or cleaving the spinal column of the bird. A cam roller 88 is mounted to the rear of the yoke assembly 75 (FIG. 1) and follows the spiral cam track 18 of the lower cam drum 14. When the neck of a bird is received in the V-shaped end portion 86 of the yoke 80, the spiral cam track 18 lifts the yoke assembly 75 so that the shoulder portion of the bird tends to rest on the yoke 80. This accommodates different bird lengths and properly positions the bird neck for the neck breaking function.

Another cam roller 89 (FIGS. 1 and 8) is mounted to the U-shaped arm 84 of the cleaver assembly 78 and follows the incline of cam track 90, lifting the cam roller 89 and the cleaver assembly 78 so as to move the cleaver 85 into spine breaking contact with the neck of the bird received in the V-shaped end portion 86 of the yoke 80.

After the neck has been broken by the cleaver 85 engaging against the yoke assembly 75, the spiral cam track 18 of the lower cam drum 14 (FIG. 1) and the cam track 90 uniformly permit the yoke assembly 75 and cleaver assembly 78 to move downwardly so as to tend to stretch the neck of the bird downwardly, which opens the break in the spinal column of the bird. The extent of this downward motion of the yoke assembly 75 and the cleaver assembly 78 may be varied as desired by adjusting cam tracks 18 and 90. A greater downward stroke will tend to cause the now broken and separated neck bones to fall out of the neck, while a lesser stroke will tend to retain the bones within the neck.

As illustrated in FIG. 1, an annular drip pan 92 is supported by the framework 11 beneath the processing path of the machine, so that any droppings from the birds will be collected in the drip pan and will not be dropped to the floor of the plant.

It will be understood that the foregoing relates only to a preferred embodiment of the present invention, and that numerous changes and modifications may be made therein without departing from the spirit and scope of the invention as set forth in the following claims.

I claim:

1. A method of processing partially eviscerated poultry in which the birds are moved in series suspended invertedly by their legs from a conveyor through a series of processing stations, said method comprising the steps of:
   moving the birds in sequence adjacent a lung extraction station having a lung extractor tube movably mounted for insertion downwardly into the visceral cavity of the bird and applying a suction to the extractor tube only when a bird is adjacent the lung extraction station, whereby in the absence of a bird adjacent the lung extraction station no suction is applied.

2. The method of claim 1 further comprising the step of moving the extractor tube downwardly in response to the presence of a bird adjacent the lung extraction station.

3. The method of claim 1 further comprising:
   positioning the bird neck in a yoke;
   engaging the bird neck with a hammer; and
   urging the hammer toward a crotch in the yoke, whereby the spinal column of the bird is substantially broken.

4. The method of claim 3 further comprising the step of moving the hammer and yoke together downwardly away from the legs of the bird, whereby the broken spinal column is further separated by the stretching caused by this downward movement.

5. The method of claim 1 and wherein the step of inserting an extractor tube downwardly into the visceral cavity of the bird and applying a suction to the extractor tube comprises moving the extractor tube into registration with an opening of a suction tube as the lower end portion of the extractor tube approaches its lowermost position inside the cavity of the bird.

6. The method of claim 5 further comprising the step of covering the opening of the suction tube as the extractor tube is withdrawn from the cavity of the bird.

7. A method of extracting the lungs of partially eviscerated poultry as the birds are moved in series suspended invertedly by their legs from a conveyor along a processing path, said method comprising the steps of:
   moving a lung extractor assembly along a portion of the processing path;
   moving an extractor tube movably mounted to the extractor assembly downwardly from a raised position to an intermediate position;
   moving the extractor tube downwardly, in response to the presence of a bird adjacent the extractor assembly, from the intermediate position to a lowered position in which a lower portion of the extractor tube is inserted into the visceral cavity of the bird;
   exposing the extractor tube to a source of reduced air pressure in response to the presence of a bird adjacent the extractor assembly to extract the lungs of the bird; and
   moving the extractor tube upwardly to the raised position.

8. A method of extracting the lungs and breaking the necks of partially eviscerated poultry as the birds are moved in series suspended invertedly by their legs from a conveyor along a processing path, said method comprising the steps of:
   moving a processing module of a machine along a portion of the processing path, with the module including a neck breaker assembly and a lung extractor assembly each movably mounted thereon;
   moving an extractor tube of the lung extractor assembly downwardly, in response to the presence of a bird adjacent the lung extractor assembly, from a raised position to a lowered position in which the lower end portion of the extractor tube is inserted into the visceral cavity of a bird adjacent the lung extractor assembly,
   exposing the extractor tube to a source of reduced air pressure to extract the lungs of the bird adjacent the lung extractor assembly,
   breaking the neck of the bird in the module; and
   moving the extractor tube upwardly to the raised position.

9. The method of claim 8 and wherein the step of breaking the neck of the bird further comprises:
   positioning the bird neck in a yoke;
   engaging the bird neck with a cleaver; and
   urging the cleaver toward a crotch in the yoke, whereby the spinal column of the bird is substantially cleaved.

10. The method of claim 9 and further including the step of moving the cleaver and yoke together downwardly away from the legs of the bird, whereby the cleft spinal column is further separated by the stretching caused by this downward movement.

11. Apparatus for extracting the lungs of partially eviscerated poultry as the birds are moved in series suspended invertedly by their legs from a conveyor along a processing path, said apparatus comprising:
    a support frame for positioning along the processing path;
    processing module mounted to said support frame for movement about said frame and including a carrier assembly;
    a lung extractor assembly mounted to said carrier and including an extractor tube slidably mounted on said carrier for movement between a lowered position and a raised position, with a lower end portion of said extractor tube being adapted for insertion into the visceral cavity of a bird positioned adjacent said module by movement of said extractor tube to said lowered position; and
    control means for exposing said extractor tube to a source of reduced air pressure in response to the presence of a bird adjacent said module.

12. The apparatus of claim 11 and wherein said control means further comprise valve means responsive to the absence of a bird adjacent said module for preventing exposure of said tube to the source of reduced air pressure, and responsive to the presence of a bird adjacent said module for exposing said tube to the source of reduced air pressure.

13. The apparatus of claim 11 and wherein said control means further comprise support means responsive to the absence of a bird adjacent said module for supporting said extractor tube in a position intermediate said raised and lowered positions, and valve means responsive to said tube being supported in said intermediate position for preventing exposure of said tube to the source of reduced air pressure and responsive to said tube being in said lowered position for exposing said tube to the source of reduced air pressure.

14. The apparatus of claim 13 and wherein said valve means further comprise:

a suction tube having an open upper end, a sealed lower end, and an aperture intermediate said ends and formed in the side of said tube;

means for communicating said suction tube with the source of reduced air pressure during a portion of said module's movement about said support frame; and an extractor tube slide block, including a chamber in communication with said extractor tube, slidably mounted about said suction tube for movement between a position with said chamber in communication with said suction tube aperture and a position with a lower portion of said slide block covering said aperture.

15. Apparatus for processing poultry as the partially eviscerated birds are moved in series along a processing path suspended invertedly by their legs from bird hangers attached to a conveyor, said apparatus comprising:

a support frame for positioning along the processing path;

neck breaker means for breaking the necks of the poultry, with said neck breaker means being mounted to said support frame, and lung extractor means mounted to said support frame for extracting the lungs of the bird, with said lung extractor means comprising a suction-powered lung extractor tube and being responsive to the absence of a bird adjacent a bird hanger as the bird hanger moves adjacent the lung extractor means for disabling said lung extractor tube.

16. Apparatus for processing partially eviscerated poultry as the birds are moved in series suspended invertedly by their legs along a processing path through a series of processing stations, said apparatus comprising:

a support frame;

a plurality of poultry processing modules movably mounted on said support frame for revolving about said support frame, each of said poultry processing modules including a carrier, a lung extractor assembly movably mounted on said carrier and a neck breaker assembly movably mounted on said carrier, means for actuating said neck breaker assemblies to engage, break and separate by stretching the bones in the neck of each bird in response to each of said modules revolving about said support frame, each of said lung extractor assemblies including an extractor tube having a lower end portion for insertion into the visceral cavity of a bird, and suction means for communicating with each extractor tube only when the lower end portion of the extractor tube is inserted in the visceral cavity of a bird, whereby the neck of each bird is broken and removed from the carcass and the lungs of each bird are extracted from the visceral cavity of each bird as the birds are moved along the processing path.

17. The method of claim 2 wherein the step of moving the extractor tube downwardly comprises the steps of moving the extractor tube from a raised position downwardly to an intermediate position, and moving the extractor tube from the intermediate position downwardly, in response to the presence of a bird adjacent the lung extraction station, to a lowered position in which a lower portion of the extractor tube is inserted into the visceral cavity of the bird.

18. The apparatus as claimed in claim 11 further comprising means for limiting downward motion of said extractor tube in response to the absence of a bird adjacent said lung extractor assembly.

* * * * *